US009385995B2

(12) United States Patent
Tsuria (10) Patent No.: US 9,385,995 B2
(45) Date of Patent: Jul. 5, 2016

(54) ANONYMOUS AUTHENTICATION (71) Applicant: Cisco Technology Inc., San Jose, CA (US)

(72) Inventor: Yossi Tsuria, Jerusalem (IL)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 14/131,363

(22) PCT Filed: Dec. 26, 2012

(86) PCT No.: PCT/IB2012/057721
§ 371 (c)(1),
(2) Date: Jan. 7, 2014

(87) PCT Pub. No.: WO2013/104967
PCT Pub. Date: Jul. 18, 2013

(65) Prior Publication Data
US 2014/0137198 A1    May 15, 2014

(30) Foreign Application Priority Data

Jan. 10, 2012  (IL) .......................................... 217478
May 9, 2012  (GB) .................................. 1208068.5

(51) Int. Cl.
*H04L 29/06* (2006.01)
*G06Q 30/06* (2012.01)
*H04L 9/32* (2006.01)

(52) U.S. Cl.
CPC ........ *H04L 63/0421* (2013.01); *G06Q 30/0609* (2013.01); *H04L 9/321* (2013.01);
(Continued)

(58) Field of Classification Search
None
See application file for complete search history.

(56) References Cited

U.S. PATENT DOCUMENTS 4,759,063 A    7/1988 Chaum
7,093,130 B1 *  8/2006 Kobayashi et al. ........... 713/176
(Continued)

FOREIGN PATENT DOCUMENTS

EP    0 139 313 A2    5/1985

OTHER PUBLICATIONS

Apr. 24, 2013 Transmittal of International Search Report and Written Opinion of the International Searching Authority for PCT/IB2012/057721.
(Continued)

*Primary Examiner* — Hadi Armouche
*Assistant Examiner* — Malcolm Cribbs
(74) *Attorney, Agent, or Firm* — Hahn Loeser & Parks, LLP (57) ABSTRACT A method and system for anonymous purchase by a first user device, is described, the method and system including sending R from the first user device to a second user device, where R is a result of a one-way function performed on a random number r selected by the first user device, the second user device being operative to send R to a service provider, which stores R with a data string T and the service provider returns a digitally signed R and T to the second user device, thereby providing the a data string T to the second user device, receiving R and T at the first user device from the second device, thereby ensuring that the identity of the first user device remains unknown to the service provider, opening a communication channel between the first user device and the service provider, sending the service provider r and T from the first user device via the communication channel along with a request for the service provider to provide a service, and receiving the requested service from the service provider. Related methods, systems and apparatus are also described.

14 Claims, 6 Drawing Sheets (52) U.S. Cl.
CPC ........... *H04L 9/3236* (2013.01); *H04L 9/3271* (2013.01); *G06Q 2220/00* (2013.01); *H04L 2209/42* (2013.01); *H04L 2209/56* (2013.01)

(56) References Cited

U.S. PATENT DOCUMENTS

| | | | |
|---|---|---|---|
| 7,328,181 B2 | 2/2008 | Sutton et al. | |
| 7,730,314 B2* | 6/2010 | Kim | 713/176 |
| 2003/0120924 A1* | 6/2003 | Immonen | 713/170 |
| 2004/0111751 A1* | 6/2004 | Tsuria | 725/104 |
| 2005/0263594 A1 | 12/2005 | Onischu | |
| 2007/0255661 A1* | 11/2007 | Yoshida et al. | 705/74 |
| 2012/0284518 A1* | 11/2012 | Walker et al. | 713/171 |

OTHER PUBLICATIONS

Sep. 7, 2012 Office Communication in connection with prosecution of GB 1208068.5.

David Chaum, "Blind signatures for untraceable payments" *Advances in Cryptology—Crypto "82*, pp. 199-203 (Springer-Verlag 1998).

David Chaum, "Security without Identification: Transaction systems to make Big Brother Obsolete," *Communications of the ACM*, vol. 28 No. 10, pp. 1030-1044 (ACM 1985).

David Chaum et al., "Untraceable electronic cash,"*Advances in Ctyptology—Crypto '88*, pp. 319-327 (Springer-Verlag 1990).

Roger Dingledine et al., "The Second-Generation Onion Router," [Abstract] (USENIX 2004).

Uriel Feige et al., "Zero-Knowledge Proofs of Identity," *Journal of Cryptology* 1:77-94 (Int'l Assn for Cryptologic Research 1988).

Eran Gabber et al., "How to Make Personalized WEB Browsing Simple, Secure, and Anonymous" (1997).

Fuh-Gwo Jeng et al., "An ECC-Based Blind Signature Scheme," *Journal of Networks*, vol. 5, No. 8 (Academy Publisher 2010).

Yehuda Lindell et al., "Private WEB Search With Malicious Adversaries" (Mar. 24, 2011).

Michael K. Reiter et al., "Crowds: Anonymity for Web Transactions" *ACM Transactions on Information and System Security* (Jun. 1998).

"Introducing I2P; I2P: A Scalable Framework for Anonymous Communication" (2011).

I2P Anonymous Network (2011).

Mar. 24, 2015 Office Communication issued in connection with GB 1208068.5.

* cited by examiner

ANONYMOUS AUTHENTICATION

RELATED APPLICATION INFORMATION

The present application is a 35 USC §371 application of PCT/IB2012/057721, filed on 26 Dec. 2012 and entitled "Anonymous Authentication", which was published in the English language with International Publication Number WO 2013/104967, and which claims the benefit of priority from GB Patent Application GB 1208068.5 of NDS Limited, filed 9 May 2012, and the benefit of priority from IL Patent Application IL 217478 of NDS Limited, filed 10 Jan. 2012.

FIELD OF THE INVENTION

The present invention relates to purchase mechanisms for user devices, and more particularly to anonymous purchase mechanisms for user devices.

BACKGROUND OF THE INVENTION

Published patent application US 2005/0263594 of Onischu describes a computerized voting system where ballots are mailed to voters who then exchange ballots before voting. Filled out ballots are then returned to a polling office. The random private ballot exchange decouples the ballot from the eligible voter rolls.

U.S. Pat. No. 7,328,181 to Sutton et al describes a system and method for transacting a purchase using a non-personalized purchase card, the non-personalized purchase card not having any card holder data thereon.

US published patent application US 2004/0111751 of Tsuria describes a method and apparatus for anonymously ordering an item in a pay-per-item system.

*Private Web Search with Malicious Adversaries*, Lindell, Yehuda, and Wasibard, Erez, in Atallah, Mikhail, ed. *Privacy Enhancing Technologies* (Lecture Notes in Computer Science, Vol.: 6205), Springer Berlin/Heidekberg 2010, pp. 220-235.

The Fiat-Shamir identification scheme is a type of parallel zero-knowledge proof that allows a first party to prove to a second party that the first party possesses secret information without revealing to the second party what that secret information is. It was described by Feige, Fiat and Shamir in "Zero-Knowledge Proofs of Identity," Journal of Cryptology 1:2 (1988).

Anonymized tokens are discussed in the following references:

D. Chaum, Blind signatures for untraceable payments: CRYPTO '82, p. 199-203. Plenum Press, 1982;
D. Chaum. Security without Identification: Transaction Systems To Make Big Brother Obsolete: Communications of the ACM, 2 8(10):103 0-10 44, October 1985; and
D. Chaum, A. Fiat, and M. Naor. Untraceable Electronic Cash: CRYPTO, volume 40 3 of LNCS, p. 319-327, 1990.

U.S. Pat. No. 4,759,063 to Chaum describes blind signature systems.

Blind Signature Schemes are also described in An ECC-Based Blind Signature Scheme of Jeng, Chen, and Chen, Journal of Networks, Vol. 5, No. 8, August 2010, available on the World Wide Web at ojs.academypublisher.com/index.php/jnw/article/viewFile/0508921928/2053.

The anonymous communications protocol Crowds is described in Crowds: Anonymity for Web Transactions, Michael Reiter and Aviel Rubin (June 1998). *ACM Transactions on Information and System Security* 1 (1). The article is available at avirubin.com/crowds.pdf.

The anonymous communications protocol Tor is described in Tor: The Second-Generation Onion Router, Dingledine, Roger; Mathewson, Nick; Syverson, Paul (13 Aug. 2004). *Proc. 13th USENIX Security Symposium*. San Diego, Calif. The article is available at www.usenix.org/events/sec04/tech/dingledine.html.

The anonymous communications protocol I2P (Invisible Internet Project) is described at www.ip2.de/techintro.html.

Financial Cryptography, International Conference, 1997, Gabber E et al., *How to Make Personalized Web Browsing Simple, Secure, and Anonymous*, describes a system for anonymous web browsing.

SUMMARY OF THE INVENTION

The present invention, in certain embodiments thereof, seeks to provide an improved method and system for anonymous authentication.

There is thus provided in accordance with an embodiment of the present invention a method for anonymous purchase by a first user device, the method including sending R from the first user device to a second user device, where R is a result of a one-way function performed on a random number r selected by the first user device, the second user device being operative to send R to a service provider, which stores R with a data string T and the service provider returns a digitally signed R and T to the second user device, thereby providing the a data string T to the second user device, receiving R and T at the first user device from the second device, thereby ensuring that the identity of the first user device remains unknown to the service provider, opening a communication channel between the first user device to the service provider, sending the service provider r and T from the first user device via the communication channel along with a request for the service provider to provide a service, and receiving the requested service from the service provider.

Further in accordance with an embodiment of the present invention the one-way function is a modular square function, so that $R=r^2$ mod N, and N is a prime number in a field Z.

Still further in accordance with an embodiment of the present invention the one-way function is a hash function, so that $R=HASH(r)$.

Additionally in accordance with an embodiment of the present invention the one-way function is a modular logarithm function, so that $R=\log_{mod\,N}(r)$, and N is a prime number in a field Z.

Moreover in accordance with an embodiment of the present invention in exchange for receiving R and T from the second user device, the first user device sends the second user device a value R' and a data string T'.

Further in accordance with an embodiment of the present invention the communication channel opened with the service provider includes an anonymous communication channel.

Still further in accordance with an embodiment of the present invention before the service provider provides the requested service, the service provider verifies that R is properly a result of a one-way function performed on r.

There is also provided in accordance with another embodiment of the present invention a method for a service provider performed by providing anonymous authentication of a first user device, the method including receiving a value R from a second device, where R is a result of a one-way function performed on a random number r selected by a first user device, the first user device sending R to the second device, storing R with a data string T, returning a digitally signed R and T to the second user device, thereby providing the data string T to the second user device, opening a communication channel between the service provider and the first user device, receiving, via the communication channel, r and T from the first user device, along with a request to provide a service, and performing the one-way function on r thereby determining R, verifying that R is stored with the received T, providing the requested service to the first user device in response to a positive result of the verifying.

Further in accordance with an embodiment of the present invention the one-way function is a modular square function, so that $R=r^2 \bmod N$, and N is a prime number in a field Z.

Still further in accordance with an embodiment of the present invention the one-way function is a hash function, so that $R=\text{HASH}(r)$.

Additionally in accordance with an embodiment of the present invention the one-way function is a modular logarithm function, so that $R=\log_{mod\ N}(r)$, and N is a prime number in a field Z.

Moreover in accordance with an embodiment of the present invention the communication channel opened with the first user device includes an anonymous communication channel.

There is also provided in accordance with still another embodiment of the present invention a system for anonymous purchase by a first user device, the system including a first data communications port disposed at the first user device operative to send R to a second user device, where R is a result of a one-way function performed on a random number r selected by the first user device, the second user device being operative to send R to a service provider, which stores R with a data string T and the service provider returns a digitally signed R and T to the second user device, thereby providing the a data string T to the second user device, a second data communications port disposed at the first user device operative to receive R and T from the second device, thereby ensuring that the identity of the first user device remains unknown to the service provider, a third data communications port disposed at the first user device operative to open a communication channel between the first user device and the service provider, the third data communications port operative to send the service provider r and T via the communication channel along with a request for the service provider to provide a service, and the third data communications port operative to receive the requested service from the service provider.

There is also provided in accordance with still another embodiment of the present invention a system for disposed at a service provider for providing anonymous authentication of a first user device, the system including a first data communications port operative to receive a value R from a second device, where R is a result of a one-way function performed on a random number r selected by a first user device, the first user device sending R to the second device, a data storage unit to store R with a data string T, a second data communications port operative to return a digitally signed R and T to the second user device, thereby providing the a data string T to the second user device, a third data communications port operative to open a communication channel between the service provider and the first user device, the third data communications port operative to receive, via the communication channel, r and T from the first user device, along with a request to provide a service, and a processor operative to perform the one-way function on r thereby determining R, the processor operative to verify that R is stored with the received T, the third data communications port operative to provide the requested service to the first user device in response to a positive result of the verifying.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
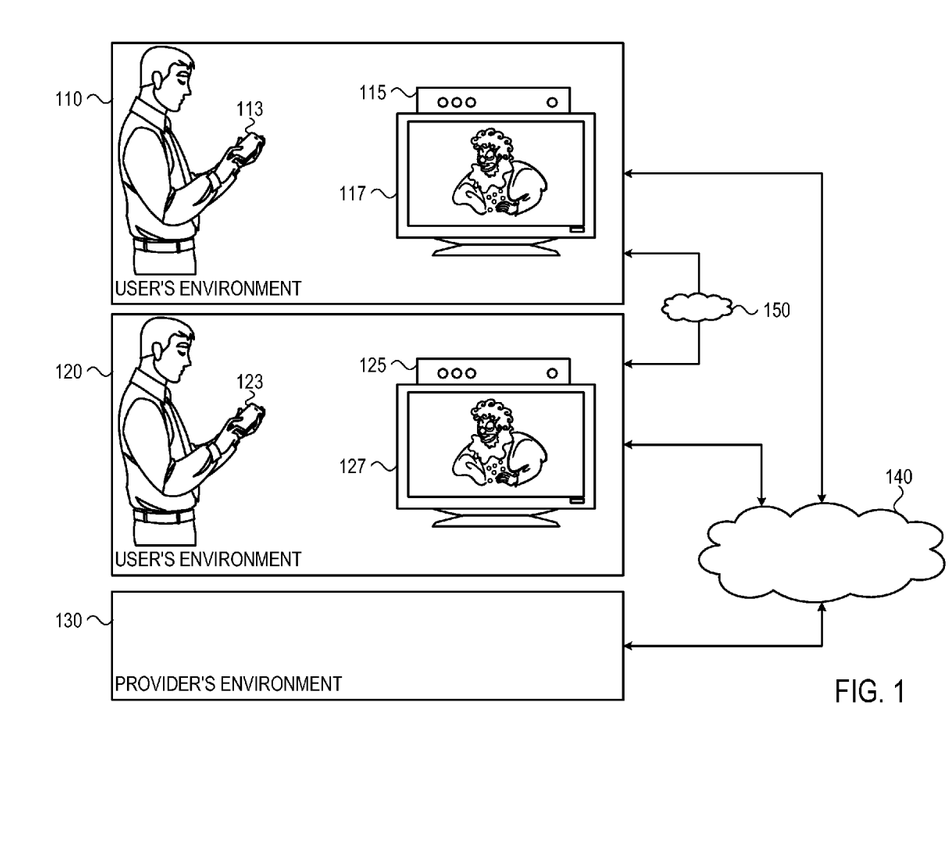
FIG. 1 is a simplified depiction of a system for anonymous purchase constructed and operative in accordance with an embodiment of the present invention.

Reference is now made to FIG. 1, which is a simplified depiction of a system for anonymous purchase constructed and operative in accordance with an embodiment of the present invention. The system of FIG. 1 comprises a plurality of users 110, 120 who wish to perform an anonymous transaction with a service provider 130. For example and without limiting the generality of the foregoing, the users 110, 120 might be users who want to anonymously purchase content (i.e. without the service provider/server (that is, the provider 130) knowing what they purchased). Alternatively, the users 110, 120 might be voters who wish to anonymously send their ballots to a central polling authority (that is, the provider 130).

The system of FIG. 1 comprises a plurality of users 110, 120, who have any one of several devices, such as, and without limiting the generality of the foregoing, handheld devices 113, 123, and PVRs or set top boxes 115, 125. The devices typically comprise computing/processing component storage and memory, as well as other standard hardware and software components, such as is well known in the art.

Additionally, the devices, such as the handheld devices 113, 123, and the PVRs or set top boxes 115, 125 may have their own displays (not depicted for the PVRs or set top boxes 115, 125) or might be attached to an external display, such as a monitor or a television, 117, 127.

The provider 130 also typically will also have a variety of hardware and software. The specific hardware and software the provider 130 has will typically be dependent on the nature of the provider 130. As was noted above, the provide may be a content provider, and thus, the provider's 130 hardware and software will be directed at providing content, such as a content database, a subscriber database, and so forth. The provider 130 may have video, video-on-demand, and music servers, and so forth, depending on the exact nature of the provider 130's business.

Alternatively, if the provider 130 is a central voting or polling authority, as noted above, the provider's 130 hardware and software will be directed at voting mechanisms. As such, the provider may have a database of registered voters, and computes which accrue and tally cast ballots, and so forth.

The service provider 130 may also be any other provider which provides a service which a user may wish to use anonymously at some point. For instance, the user may wish to purchase a present for his or her spouse, without the spouse being able to know about purchase, in order to maintain a surprise, until the present is given to the spouse. In order to anonymously make the purchase, the user anonymously purchases a token, using the method and system described herein below. The token may comprise a pre-paid purchased token, a subscription token, a credit-based purchased token. Alternatively, any other appropriate method may be used to purchase the token. Throughout the system described below, the service provider/server (that is, the provider 130) is able to verify, at any stage, that the token is authentic and not duplicated.

The handheld devices 113, 123, and PVRs or set top boxes 115, 125 are in communication via a network 140 with the provider 130. The network 140 may be a cable television network, a satellite television network, a telephone network, local and wide area networks, the Internet, some combination of all of the above, or some other appropriate network. Additionally, the handheld devices 113, 123, and PVRs or set top boxes 115, 125 are in communication with each other 150 either over one of the networks mentioned above or in communication via Bluetooth or other appropriate communication protocol. The communication channel 150 between the handheld devices 113, 123, and PVRs or set top boxes 115, 125 may be an authenticated communication channel between the handheld devices 113, 123, and PVRs or set top boxes 115, 125.

It is appreciated that the handheld devices 113, 123, and PVRs or set top boxes 115, 125 comprise standard hardware and software as is known in the art. For example and without limiting the generality of the foregoing, the various devices 113, 123, 115, 125, will typically comprise at least a processor; data communications ports for various communications protocols, for example and without limiting the generality of the foregoing, wireless Internet, Bluetooth, Ethernet; memory; storage; and so forth. Additionally, the handheld devices 113, 123, and PVRs or set top boxes 115, 125 comprise a random number generator.

It is also appreciated that the service provider comprises servers, databases, and at least one computer equipped with at least one processor, communications ports; memory; storage; and so forth.

A minimalistic version of a protocol to execute the method of FIG. 1 is explained below with reference to FIG. 2. A second user device 220 sends some data to the provider 130. The provider 130 then both: sends the second user device 220 a data string, which may be thought of as a token; and stores a record of the data sent by the second user device 220 along with the data string. The data strings received by second user device 220 are exchanged among the various user devices 113, 123. As was noted above, tokens may be purchased, using any appropriate method known for executing such purchases. Alternatively, the token may be bartered with other users, or given freely.

Users perform one or both of the following:
The user device retains a data parameter (referred to herein below as random number, r) which enables the user device to prove to the service provider 130 that the user device is legitimately entitled to possess the data string; and the provider 130 updates the stored records so that the exchanged data strings are now stored with the recipient's stored data.

Thus, when a user 110, 120 wishes to execute an anonymous transaction with the provider 130, the user 110, 120 may do so, utilizing the data string it presently possesses. Once the user 110, 120 is able to prove that the data string is legitimately in its possession, the provider 130 provides the requested service to the user 110, 120, without knowing the identity of the user 110, 120.

Unlike other anonymity systems whose sole purpose is to protect the privacy of the end users, the method and system of the embodiments of the present invention described herein also protects the service provider 130 from abuse and piracy. Embodiments of the present invention ensure that tokens (which may be purchased, as explained above) are used only once. Furthermore, embodiments of the present invention protect the end users 110, 120 from entities that will try to abuse the system, for example by providing "already used" tokens to the honest user.

A more complex version of a protocol to execute the method of FIG. 1 is described below with reference to FIGS. 3 and 4. The description of FIGS. 3 and 4 discusses, by way of example only, executing the protocol of the method of FIG. 1 using modular squares as the one-way function. Those skilled in the art will appreciate that any other appropriate one-way function may be used as well in executing the protocols depicted herein.

Figure 2:
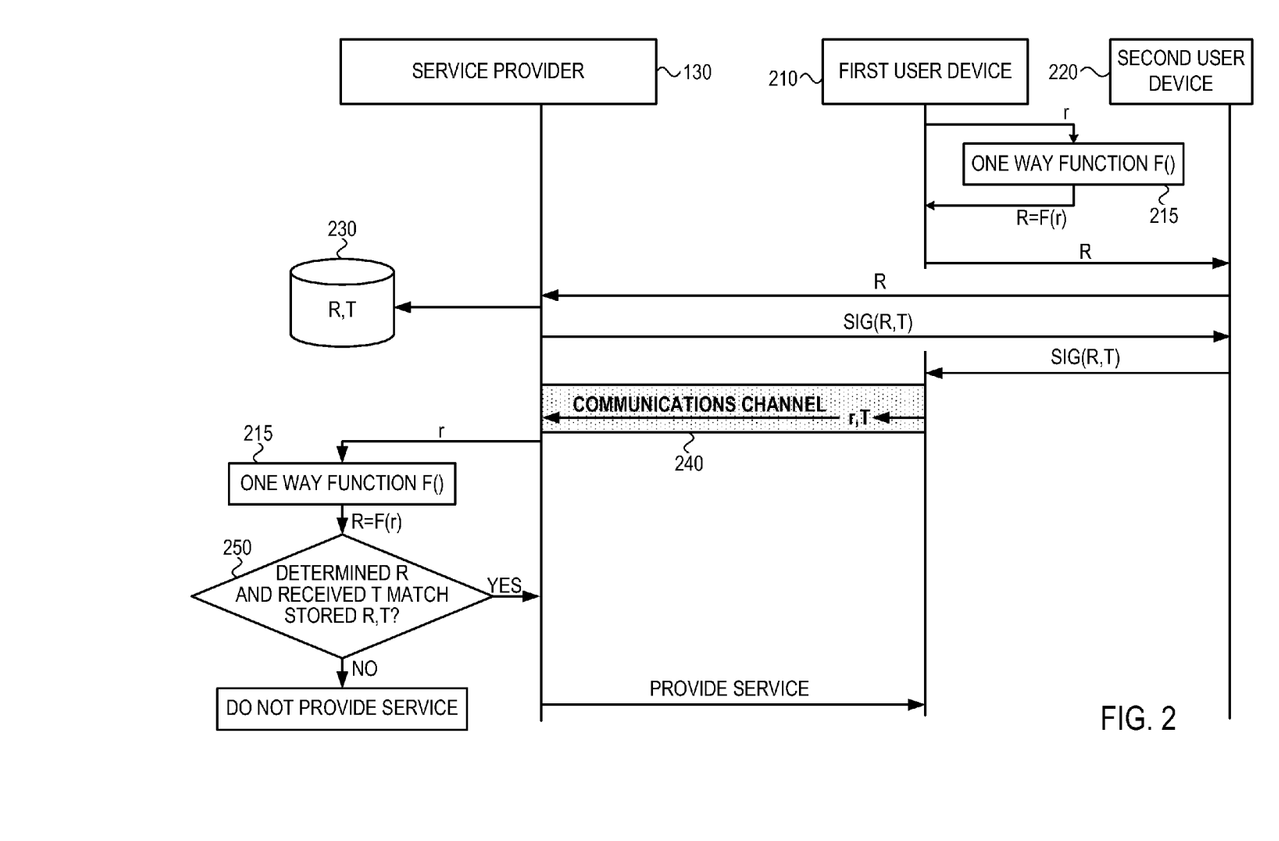
FIG. 2 is a data flow diagram depicting a generic embodiment for the anonymous purchase system of FIG. 1 where only one device is executing the method of FIG. 1.

Reference is now made to FIG. 2, which is a data flow diagram depicting a generic embodiment for the anonymous purchase system of FIG. 1 where only one device is executing the method of FIG. 1.

At a first stage, a first user device 210 selects a random number r. A one-way function 215 is performed on r, to yield R. Therefore, as depicted in FIG. 2, $R=F(r)$, where F is the one-way function 215. Well known one-way functions include, but are not necessarily limited to: modular square functions; modular logarithm functions; hash functions; functions designed to find the prime factors for a given integer; and functions designed to find a discrete logarithm for a given discrete exponential function. Other one-way functions may also exist.

Those skilled in the art will appreciate that references to one-way functions refer to that class of functions wherein:
1. the description of function $f$ is publically known and does not require any secret information for the operation of $f$;
2. given x it is computationally easy to compute $f(x)$; and
3. given y, in the range of $f$, it is computationally difficult to find an x such that $f(x)=y$.

It is further appreciated that the existence of one-way functions is not mathematically proven. For the purpose of the present specification and claims, functions which are known to be conjectured (or candidate) one-way functions are referred to, for ease of discussion, as one-way functions 215.

The first user device 210 sends R to the second user device 220. The second user device 220, in turn, sends R to a service provider. The service provider returns a data string, i.e. a token, T, along with R back to the second user device 220. In some embodiments of the present invention, the service provider returns R and T to the second user device 220 digitally signed (depicted as SIG(R,T)). The service provider also stores R and T together 230 in a record, so that if a device wishes to utilize token T, the device must prove that it possesses R.

The second user device 220 returns R and T (or SIG(R,T)) to the first user device 210.

The first user device 210 opens a communications channel 240 with the service provider 130. In some embodiments of the present invention the communications channel may comprise an anonymous communications channel. A protocol such as Crowds, Tor, or I2P may be used to support such an anonymous communications channel.

The first user device 210 sends r and T to the service provider, via the communications channel, along with a request for the service provider to provide a service.

The service provider determines the result of the one-way function 215 F(r), thereby determining R. The service provider then determines if R and T match the stored R and T 250.

In response to a positive result of the determining that the determined R and the received T match the stored R and T, the service provider then provides the requested service.

Figure 3:
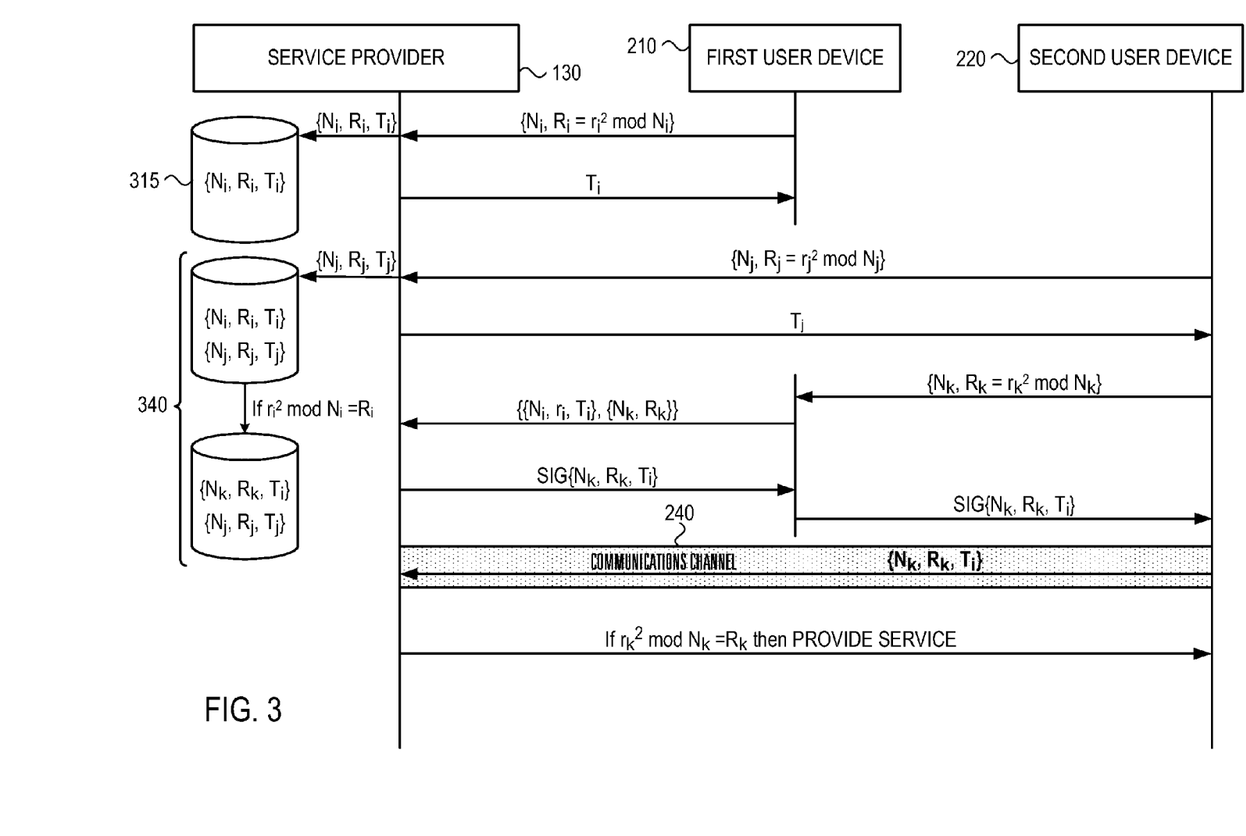
FIG. 3 is a data flow diagram depicting an embodiment of the anonymous purchase system of FIG. 1, utilizing modular squares, where only one device is executing the method of FIG. 1.
Figure 4:
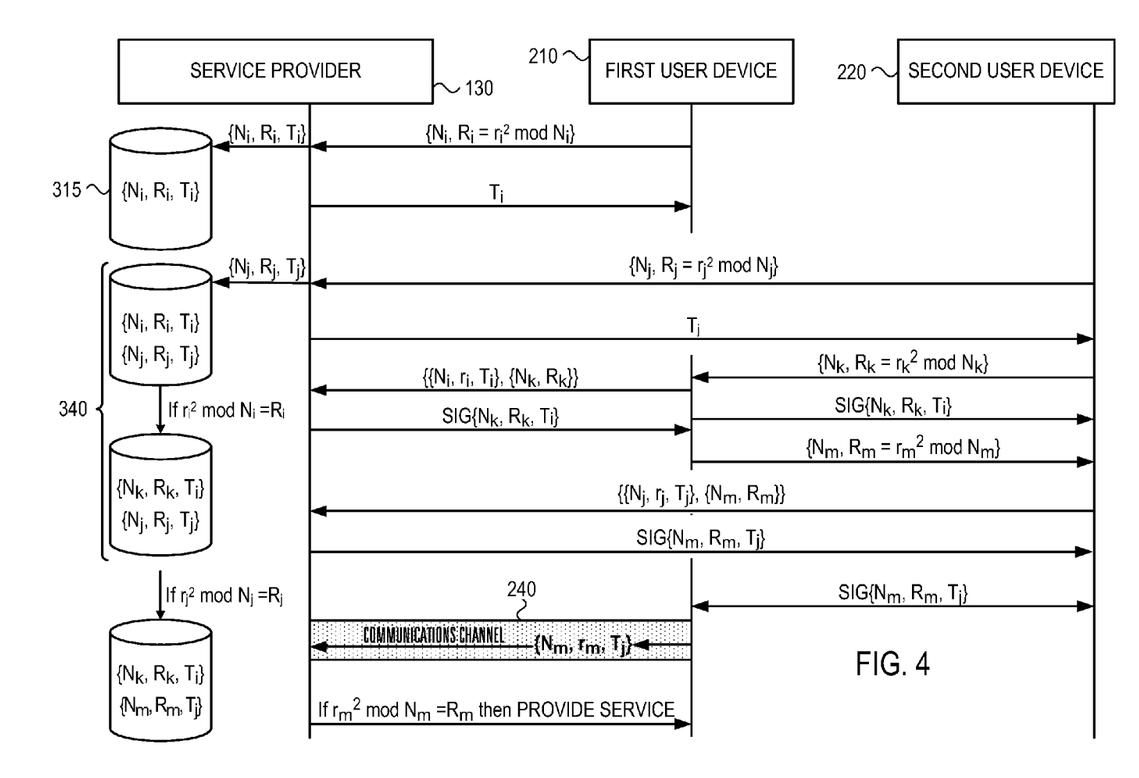
FIG. 4 is a data flow diagram depicting an embodiment of the anonymous purchase system of FIG. 1, utilizing modular squares, where at least two devices are mutually executing the method of FIG. 1.

Reference is now made to FIG. 3, which is a data flow diagram depicting an embodiment of the anonymous purchase system of FIG. 1, utilizing modular squares, where only one device is executing the method of FIG. 1. Reference is additionally made to FIG. 4, which is a data flow diagram depicting an embodiment of the anonymous purchase system of FIG. 1, utilizing modular squares, where at least two devices are mutually executing the method of FIG. 1.

In the first stage of execution of the method of the system of FIG. 1, the service provider 130 grants the data string, (i.e., the token, as noted above) to the first user device 210 (corresponding to one of the handheld devices 113, 123, and PVRs or set top boxes 115, 125 of FIG. 1):

a. The first user device 210 arbitrarily selects a field $Z_{Ni}$, and a random element in field $Z_{Ni}$, $r_i$, where $N_i$ is a prime number in the field Z.

b. The first user device 210 sends $\{N_i, R_i\}$ to the service provider 130, where $R_i = r_i^2 \mod N_i$. Those skilled in the art will appreciate that determining the square root of $R_i$ where $R_i$ is modular is known to be a computationally difficult problem.

c. The service provider 130 sends a token $T_i$ to the first user device 210. The service provider 130 stores a record (for instance in a database of such records) 315 of $\{N_i, R_i, T_i\}$.

It is noted that at this stage in the communications between the service provider 130 and the first user device 210 that the service provider 130 "knows" that $T_i$ was granted to the first user device 210.

The next stage of execution of the method of the system of FIG. 1 has the first user device 210 send its token to the second user device 220:

d. The second user device 220 has received a token $T_j$ from the service provider 130, in a fashion corresponding to steps a-c above. Thus, the first user device 210 now has $\{N_i, R_i, T_i\}$ and the second user device 220 now has token $\{N_j, R_j, T_j\}$.

e. In the system where only one device is executing the method of the system of FIG. 1, the first user device 210 'negotiates' with the second user device 220 in order to receive the second user device's 220 token, $T_j$. In some embodiments of the present invention, agreement is reached between the first user device 210 'negotiates' with the second user device 220 by mutual agreement or by a financial transaction, i.e., money in exchange for a token.

f. The second user device 220 arbitrarily selects a field $Z_{Nk}$, and a random element in field $Z_{Nk}$, $r_k$, where $N_k$ is a prime number in the field Z. The second user device 220 sends $\{N_k, R_k\}$ to the first user device 210, where $R_k = r_k^2 \mod N_k$.

g. The first user device 210 sends the service provider 130 $\{\{N_i, r_i, T_i\}, \{N_k, R_k\}\}$ and requests that the service provider 130 change the stored record of $\{N_i, R_i, T_i\}$ to $\{N_k, R_k, T_i\}$.

h. The service provider 130 checks that $r_i^2 = R_i \mod N_i$. If $r_i^2 = R_i \mod N_i$ then it has been proven to the service provider 130 that the first user device 210 is the owner of $T_i$, and therefore the service provider 130 executes the requested record change. Accordingly, the service provider 130 now has a record storing $\{N_k, R_k, T_i\}$ 340.

i. The service provider 130 then sends $\{N_k, R_k, T_i\}$ to first user device 210. The first user device 210 then sends $\{N_k, R_k, T_i\}$ to the second user device 220. At this stage, the second user device 220 now has access to $T_i$, and can perform an anonymous transaction using $T_1$.

It is appreciated that the service provider 130 may send a digitally signed version of $\{N_k, R_k, T_i\}$, $SIG\{N_k, R_k, T_i\}$, to first user device 210. The first user device 210 then sends $SIG\{N_k, R_k, T_i\}$ to the second user device 220. The second user device 220 verifies that $SIG\{N_k, R_k, T_i\}$ is correctly signed. It is appreciated that the signature proves the exclusivity of the token (i.e. that the token was not given by the first user device 210 to both the second user device 220 and a third user device.

j. The second user device 220 is able to send its token, to the first user device 210 (or any other appropriate device), by executing steps d through i. Such a procedure is depicted in FIG. 4. At the conclusion of the second user devices 220 execution of steps d through i, the first user device 210 should possess $\{N_m, r_m, T_j\}$ (as is indicated in FIG. 4).

In the final stage of execution of the method of the system of FIG. 1, as depicted in FIG. 3, the first user device 210 consumes token $T_i$:

k. The second user device 220 opens a communications channel with the service provider 130. In some embodiments of the present invention the communications channel may comprise an anonymous communications channel. A protocol such as Crowds, Tor, or I2P may be used to support such an anonymous communications channel.

l. The first user device 210 sends $\{N_k, r_k, T_i\}$ to the service provider 130.

m. The service provider 130 verifies that $r_k^2 \mod N = R_{k\,k}$ (the service provider 130 should have a stored record comprising $\{N_k, r_k, T_i\}$. If $r_k^2 \mod N = R_k$ then the service provider 130 provides the requested service through the open communication channel.

It is appreciated that a single user device (say the first user device 210) can execute the protocol described above with itself by selecting both $N_i$ and $N_j$, and performing the steps described above with the service provider 130.

Those skilled in the art will appreciate that if the token is not a one-time use token, it is preferable to change the values N and R after each time the token is consumed. Alternatively, in that anonymity is assured, there is no need to change the values of N and R after each time the token is consumed.

The first user device 210 can obtain the token on behalf of the second user device 220 without the service provider 130 having knowledge about the identity of first user device 210. In order to do so, the first user device 210 provides the service provider with $R_k$ selected by the second user device 220.

As was mentioned above, the protocol described with reference to FIGS. 2-4 can be used for anonymous purchases, voting, or any other transaction where it is desirable for at least one party involved in the transaction to retain anonymity.

It is also appreciated that, instead of using modular squares and square roots, the method described above may be executed pre-images of cryptographic hash functions. For example and without limiting the generality of the foregoing, using a one-way hash function (such as one of the SHA-2 family of one-way hash functions), instead of selecting Z, r, and R, such that $R = r^2 \mod N$, where N is a prime number in the field Z (as has been noted throughout the present specification), for one-way hash function F, $r = F(r)$. R is then used throughout the remaining protocol as is already described herein. Accordingly, when the service provider 130 needs to verify that a request originates with a valid user who is entitled to utilize the token, the user provides the service provider 130 with r and the service provider 130 verifies that R=F(r). Likewise, the user (i.e. one or both of first user device 210 and second user device 220) selects r and computes R=F(r).

Those skilled in the art will appreciate that any other one-way function may constitute the relationship between any r and R. For example and without limiting the generality of the foregoing, the one-way function may comprise:

finding the prime factors for a given integer;
 finding a discrete logarithm for a given discrete exponential function; and
 other one-way functions.

It is further appreciated that if there are only two users of the system described herein, then service provider 130 would have a 50% chance of correctly guessing which user is the holder of the token which is used to anonymously request a service. Accordingly, a larger number of users of the system described herein correspondingly decreases the odds that service provider 130 would be able to correctly guess which user is the holder of the token used to anonymously request a service.

The above supposes that the second user device 220 is a legitimate user of the system. It is appreciated that if the second user device 220 quits after receiving $T_i$ from the first user device 210 without ever sending the first user device 210 token $T_j$, then the second user device 220 would have two tokens, $T_i$ and $T_j$, and the first user device 210 would have no tokens.

Additionally, if the service provider 130 wishes to determine the identity of the users of the system of FIG. 1, then the service provider 130 may plant end-users. For example and without limiting the generality of the foregoing, if the second user device 220 is controlled by the service provider 130, and the second user device 220 performs many token exchange transactions with many first user devices 210, then the service provider 130 is effectively able to track which users are the holders of the many first user devices 210 with which the second user device 220 has exchanged tokens.

One method to avoid, or at least to frustrate, such attacks would be for the first user device 210 to perform the exchange process with more than one other user. For example and without limiting the generality of the foregoing, the first user device 210 may perform the exchange process with five other devices. The first user device 210 should also perform the exchange process with different other users for different exchanges.

Figure 5:
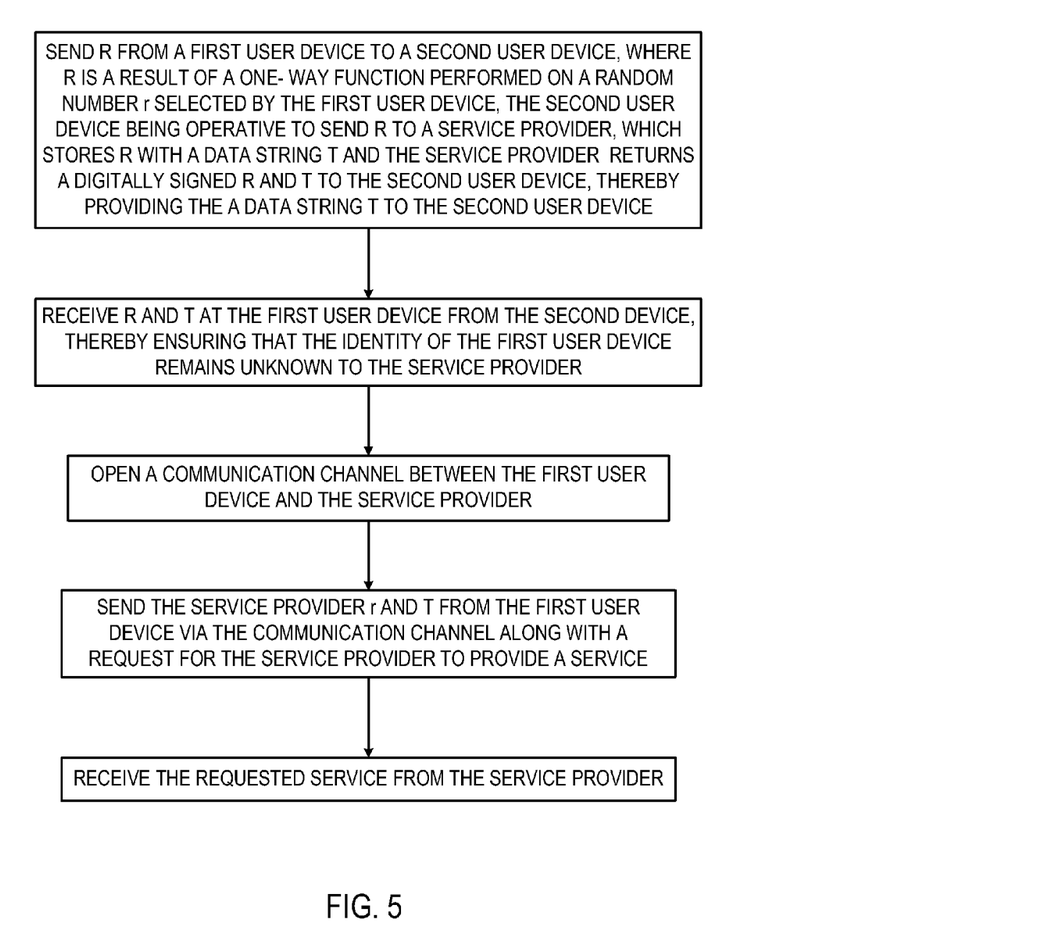
FIGS. 5-6 are simplified flowcharts of preferred methods of operation of the system of FIG. 1.
Figure 6:
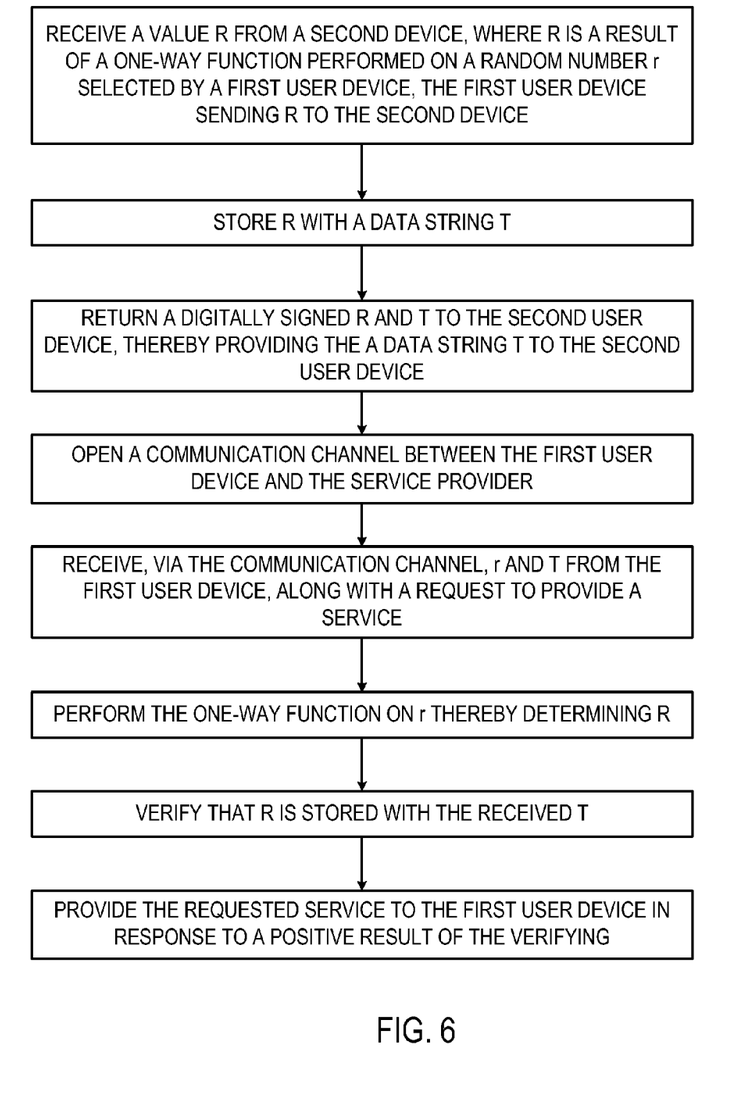

Reference is now made to FIGS. 5-6, which are simplified flowcharts of preferred methods of operation of the system of FIG. 1. FIGS. 5-6 are believed to be self-explanatory in light of the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A method for anonymous purchase by a first user device, the method comprising performing in the first user device:
 obtaining an anonymized token, data string T, by performing the following steps:
 selecting a random number r;
 deriving a result, R, by performing a one-way function on the random number r;
 sending R from the first user device to a second user device, the second user device sending R to a service provider, the service provider storing R with a data string T and returning a digitally signed R and T to the second user device, thereby providing the data string T to the second user device;
 storing r;
 receiving, from the second user device, R and T at the first user device, thereby ensuring that the identity of the first user device remains unknown to the service provider;
 using T to execute an anonymous purchase of a service by performing the following steps:
 opening a communication channel between the first user device and the service provider;
 sending the service provider the stored r and the received T from the first user device to the service provider via the communication channel along with a request for the service provider to provide a service; and
 receiving the requested service from the service provider.

2. The method according to claim 1 wherein the one-way function is a modular square function, so that R=$r^2$: mod N, and N is a prime number in a field Z.

3. The method according to claim 1 wherein the one-way function is a hash function, so that R=HASH(r).

4. The method according to claim 1 wherein the one-way function is a modular logarithm function, so that R=$\log_{mod\,N}$ (r), and N is a prime number in a field Z.

5. The method according to claim 1 and wherein, in exchange for receiving R and T from the second user device, the first user device sends the second user device a value R' and a data string T'.

6. The method according to claim 1 wherein the communication channel opened with the service provider comprises an anonymous communication channel.

7. The method according to claim 1 wherein before the service provider provides the requested service, the service provider verifies that R is properly a result of a one-way function performed on r.

8. A method performed by a service provider for providing anonymous authentication of a first user device, the method comprising:
 receiving a value R from a second user device, where R is a result of a one-way function performed on a random number r selected and stored by a first user device, the first user device sending R to the second device;
 storing R with an anonymized token, data string T;
 returning a digitally signed R and T to the second user device, thereby providing the data string T to the second user device;

opening a communication channel between the first user device and the service provider;

receiving, via the communication channel, the stored r and T from the first user device, along with a request to provide a service; and performing the one-way function on the received r thereby determining R;

verifying that the determined R is equivalent to the stored R and the received T is equivalent to the stored T; and providing the requested service to the first user device in response to a positive result of the verifying, without the service provider needing to know the identity of a user of the first user device.

9. The method according to claim 8 wherein the one-way function is a modular square function, so that $R=r^2 \mod N$, and N is a prime number in a field Z.

10. The method according to claim 8 wherein the one-way function is a hash function, so that $R=HASH(r)$.

11. The method according to claim 8 wherein the one-way function is a modular logarithm function, so that $R=\log_{\mod N}(r)$, and N is a prime number in a field Z.

12. The method according to claim 8 wherein the communication channel opened with the first user device comprises an anonymous communication channel.

13. A system disposed at a first user device for anonymous purchase, the system comprising:

a processor which selects a random number, r, and derives a result, R, by performing a one-way function on a random number r;

a first data communications port disposed in the first user device configured to send R to a second user device, the second user device being configured to send R to a service provider, which stores R with a data string T and the service provider being configured to return a digitally signed R and T to the second user device, thereby providing the data string T to the second user device;

a data store which stores r;

a second data communications port disposed in the first user device configured to receive R and T from the second user device, thereby ensuring that the identity of the first user device remains unknown to the service provider;

a third data communications port disposed in the first user device configured to open a communication channel between the first user device and the service provider;

the third data communications port configured to send the service provider the stored r and the received T via the communication channel along with an anonymous purchase of a service, the anonymous purchase comprising a request for the service provider to provide the service; and the third data communications port configured to receive the requested service from the service provider.

14. A system disposed at a service provider for providing anonymous authentication of a first user device, the system comprising:

a first data communications port configured to receive a value R from a second user device, where R is a result of a one-way function performed on a random number r selected by a first user device, the first user device sending R to the second device;

a data storage unit to store R with an anonymized token, data string T;

a second data communications port configured to return a digitally signed R and T to the second user device, thereby providing the data string T to the second user device;

a third data communications port configured to open a communication channel between the first user device and the service provider;

the third data communications port configured to receive, via the communication channel, r and T from the first user device, along with a request to provide a service; and a processor configured to perform the one-way function on r thereby determining R;

the processor configured to verify that R is stored with the received T; and the third data communications port configured to provide the requested service to the first user device in response to a positive result of the verifying, without the service provider needing to know the identity of a user of the first user device.

\* \* \* \* \*